United States Patent [19]
Camaisa et al.

[11] Patent Number: 5,784,564
[45] Date of Patent: Jul. 21, 1998

[54] CLOSED BROWSER FOR COMPUTER AND COMPUTER NETWORK

[75] Inventors: Allan J. Camaisa, La Jolla; Kevin R. Walden, Escondido; Timothy G. Klepeis, San Diego, all of Calif.

[73] Assignee: High Technology Solutions, Inc., San Diego, Calif.

[21] Appl. No.: 642,303

[22] Filed: May 3, 1996

[51] Int. Cl.$^6$ ................................................ G06F 13/00
[52] U.S. Cl. ........................... 395/200.54; 395/200.55
[58] Field of Search .................... 395/186, 187.01, 395/601, 609, 200.02, 200.06, 793, 200.48, 200.54, 200.55, 188.01, 200.57; 380/49

[56] References Cited

U.S. PATENT DOCUMENTS

| | | | |
|---|---|---|---|
| 5,261,102 | 11/1993 | Hoffman | 395/186 |
| 5,414,844 | 5/1995 | Wang | 395/186 |
| 5,572,643 | 11/1996 | Judson | 395/793 |
| 5,673,322 | 9/1997 | Pepe et al. | 380/49 |
| 5,678,041 | 10/1997 | Baker et al. | 395/188.01 |
| 5,696,898 | 12/1997 | Baker et al. | 395/187.01 |
| 5,706,507 | 1/1998 | Schloss | 395/609 |
| 5,708,780 | 1/1998 | Levergood et al. | 395/200.57 |

OTHER PUBLICATIONS

Complete Guide to LANtastic–Network Operating System, Windows Version 5.0, ©1991–1993, pp. 1–2, 7–8, 10–16, 51, 64–65, 71–74.

WebTrack Lets IS Managers Monitor Corporate Web Use Jul. 10, 1995, InfoWorld.

Anne Knowles, Proxy Tools Offer Custom Web Access, PC Week, pp. 31–32, Aug. 14, 1995.

Cyber Sentry Keeps Eye on Net Access, PC Week, pp. 59–60, Sep. 11, 1995.

Raynovich, R. Scott, Complex browsers seek to expand role, LAN Times, pp. 1–2 (full text only), Jul. 1995.

Sullivan, Kristina B., Metering role expands, PC Week, p. N3–, (full text only), Jan. 1996.

Moody, Glyn, Do you want to take control of the Internet?, Computer Weekly, p. 43–, (full text only), Feb. 1996.

*Primary Examiner*—Parshotam S. Lall
*Assistant Examiner*—Patrice L. Winder
*Attorney, Agent, or Firm*—John L. Rogitz

[57] ABSTRACT

A closed browser for navigating the world-wide web includes a tabular listing of destination addresses, such as uniform resource location codes (URL). Thus, the destination addresses can correspond to open links on the Internet, closed links on the Internet, and may also correspond to one or more local area networks (LANs)/intranets, and indeed to particular directories or files on the LAN or single user hard drive. A user may select a destination address only from the tabular listing, and may not directly input a URL that is not contained in the listing. A closed site determiner utility is also provided for determining whether a link is open or closed, based on user-defined criteria.

15 Claims, 3 Drawing Sheets

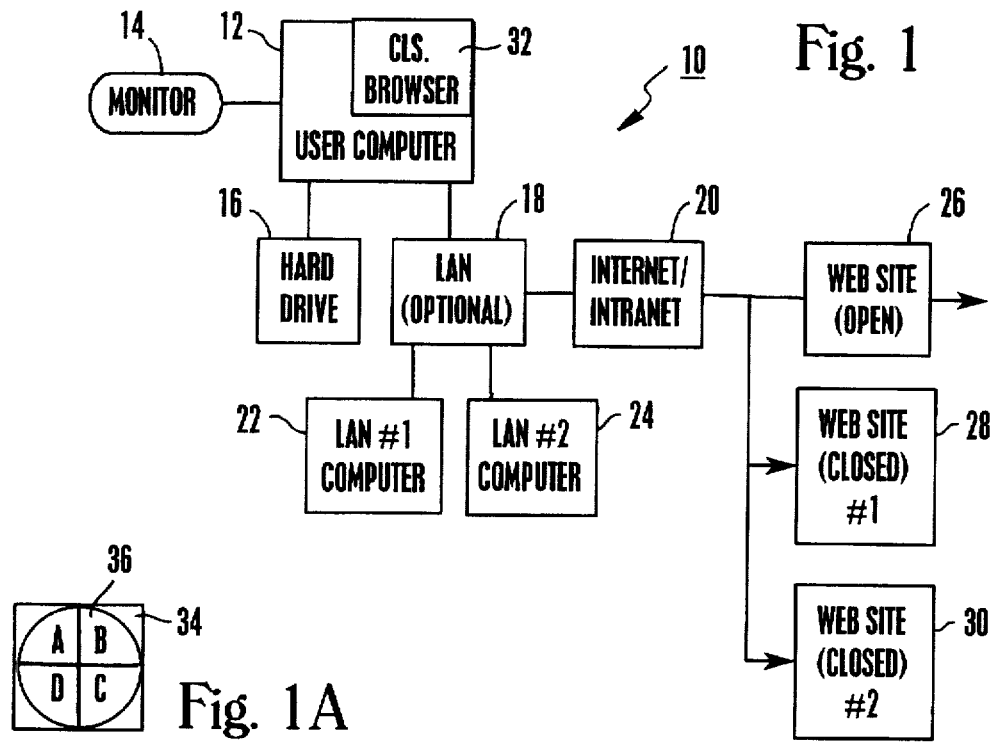
Fig. 1
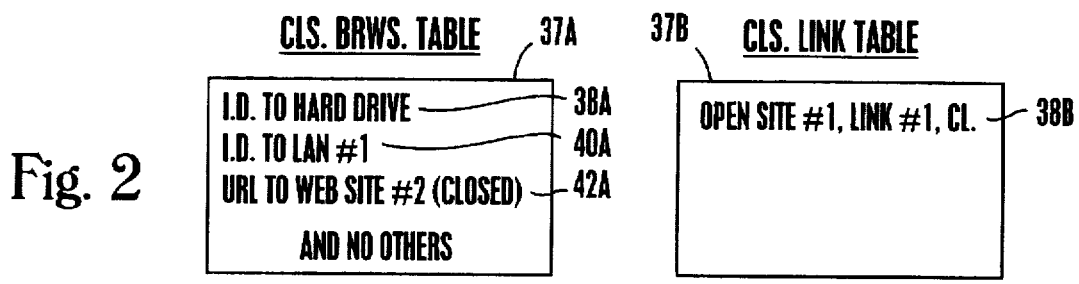
Fig. 1A
Fig. 2
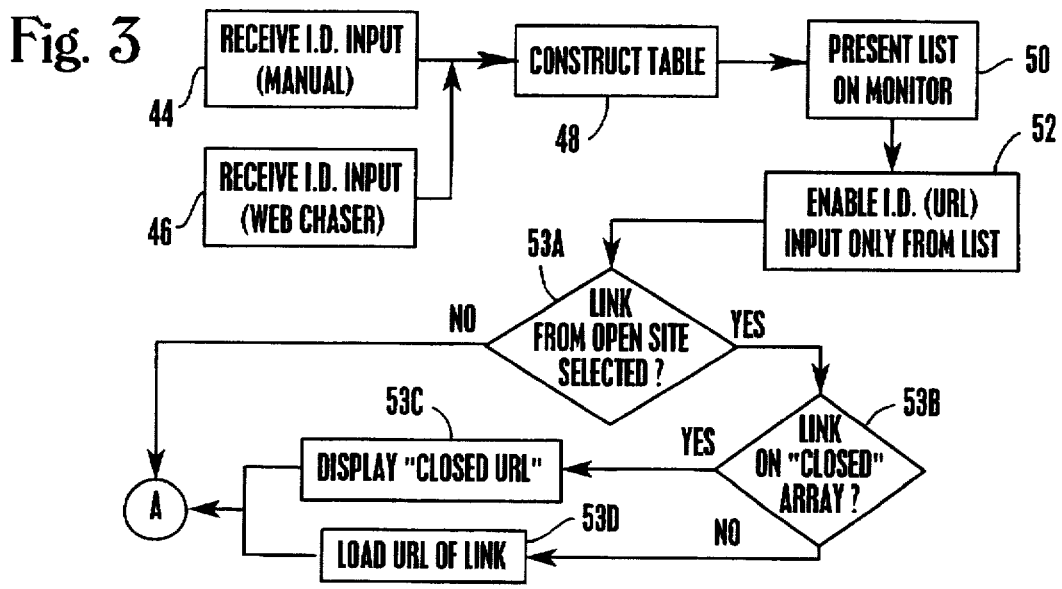
Fig. 3

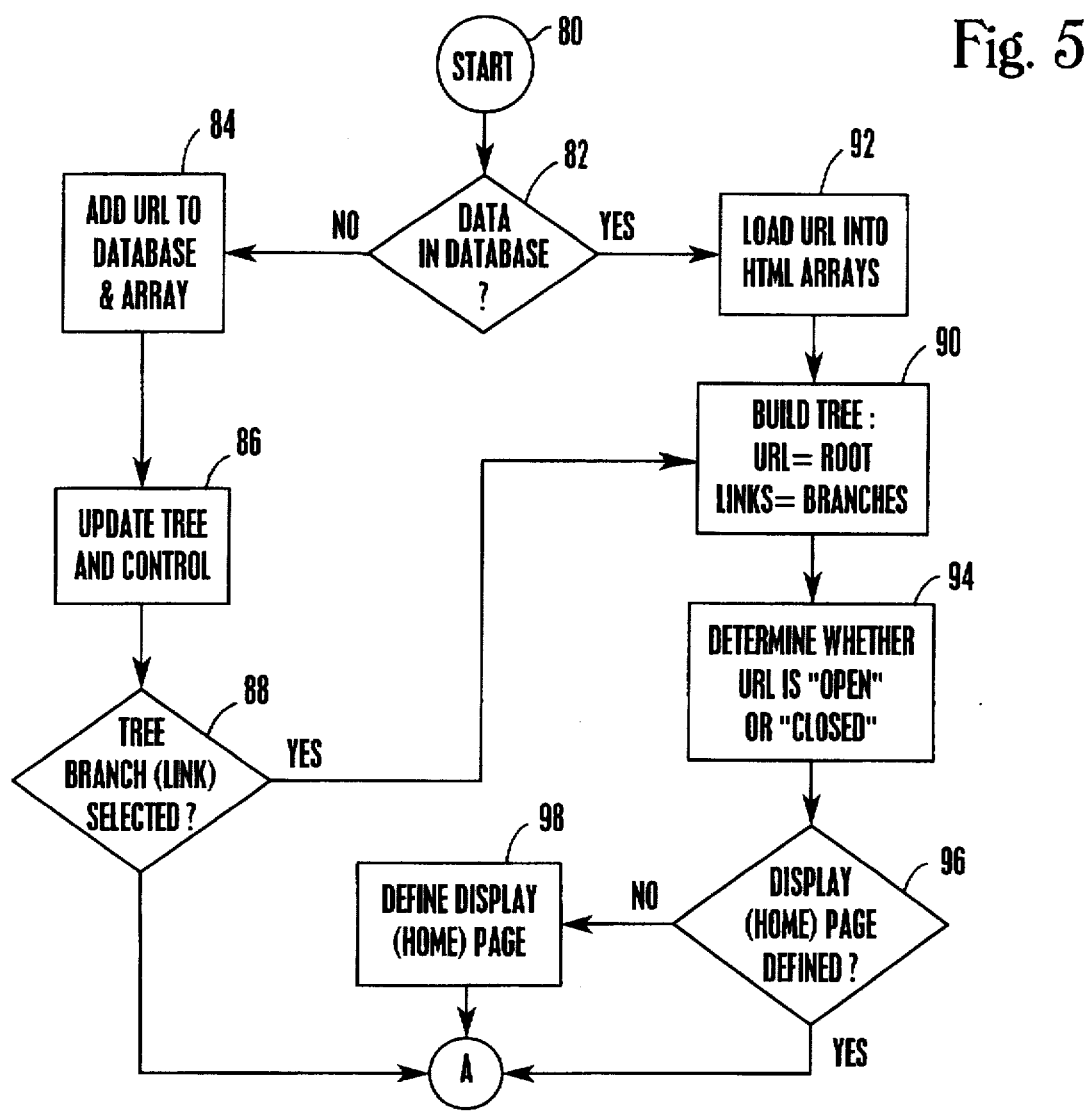
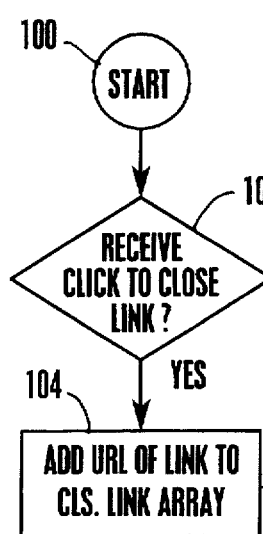
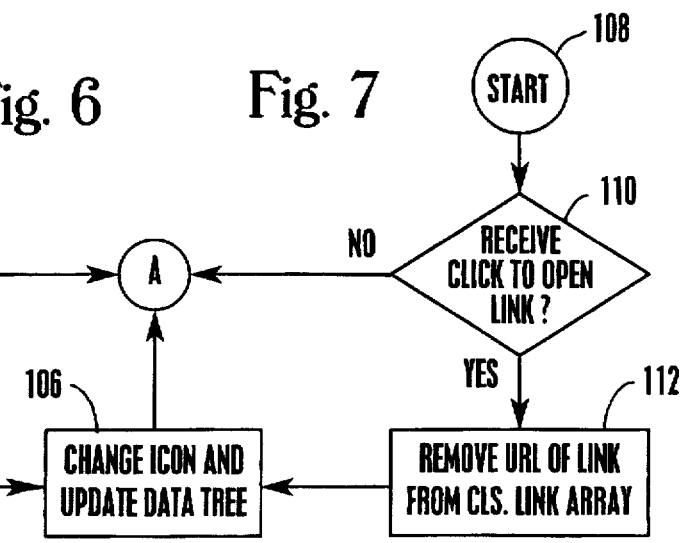
Fig. 5
Fig. 6
Fig. 7

CLOSED BROWSER FOR COMPUTER AND COMPUTER NETWORK

FIELD OF THE INVENTION

The present invention relates generally to computer-implemented aids for navigating computer networks, and more particularly to browsers for wide area computer networks such as the internet, and for intranets, hard drives, and local computer peripherals.

BACKGROUND

Computer networks are ubiquitous features in modern life. For example, many offices are equipped with so-called local area networks (LANs), in which the computers in a particular office can communicate with each other over the network. Further, the use of so-called wide area networks such as the Internet is growing.

In wide area networks, a user can connect his or her computer or indeed an entire LAN to the wide area network via a telephone line, cable television line, or wireless connection. Then, the user can input the node-unique computer addresses, referred to as uniform resource locations (URL), of other user nodes of the network using a software utility referred to as a "browser". In accordance with principles well-known in the art, the browser connects the user's node to the other node or nodes identified by the URL, and further enables the user to "browse" through the various nodes of the Internet.

In some instances, it is possible for a user at a first user node to access, while browsing, a second node via a third node that essentially functions as an intermediate network node. Such intermediate nodes, when they afford access to multiple levels of other network nodes, are colloquially referred to as "open links". In contrast, a node that does not afford intermediate access to other nodes to any significant extent is colloquially referred to as a "closed link". In any case, the user's computer or LAN, when "linked" (i.e., connected) to a wide area network, can communicate with a large number of network users world-wide.

Wide area networks have other applications in addition to those discussed above. For example, as recognized herein wide area networks make possible the use of computer-based, interactive, standalone kiosks that can be installed at public places to, e.g., permit tourists to use the kiosks to identify and locate nearby restaurants, hotels, tourist attractions, and so on. Such kiosks would advantageously be able to afford access to menus, lists of services, and other information pertaining to the service providers by connecting the kiosk computer to a portion of the Internet referred to as the "World Wide Web" (WWW). As is well-known in the art, many service providers purchase computerized advertising files, known as "Web pages", that can be accessed via the WWW by users, including kiosk users, to thereby render the advertising information available to the kiosk users.

With the above uses of wide area networks in mind, the present invention recognizes that under certain circumstances, it is desirable to limit a user's network access. For example, service providers who would underwrite public computer kiosks would prefer that users of the kiosks be able to access the Web pages of the service providers, without affording access to the thousands of other nodes on the network. Otherwise, a kiosk user would essentially be able to "browse" through the Internet at the expense of the underwriting service providers. Alternatively, it might be acceptable to permit a kiosk user the ability to access any closed node, but not any open nodes on the Internet.

Likewise, it might be desirable for certain nodes of a LAN that is connected to the Internet to be unable to access the Internet at all, but only to access other nodes on the LAN. For example, in a LAN over which one or more nodes transmits classified data, for security reasons it might be desirable to limit the access of one or more of the nodes only to other nodes on the LAN, without permitting the nodes access to the Internet.

Unfortunately, current browsers enable users to input any URL, without restriction, and thus to access any node in a wide area network such as the Internet. For the above-stated reasons recognized by the present invention, however, under some circumstances it is desirable to limit a user's network access to particular nodes.

Accordingly, it is an object of the present invention to provide a closed browser which enables the user of a networked computer to access only preselected nodes in the network. Another object of the present invention is to provide a method and apparatus for determining whether computer network nodes are open or closed. Still another object of the present invention is to provide a computer-based network access utility which is easy to use and cost-effective.

SUMMARY OF THE INVENTION

A computer program device is used by a digital processor to provide a closed WEB browser, such that only predetermined node locations or indeed only predetermined files on a local data storage device such as a hard drive can be accessed using a conventional computer network navigation program. As intended by the present invention, the program device is realized in a critical machine component that causes the digital processor to perform method steps to provide a closed network browser. Stated differently, a machine component establishes a computer program product for establishing a closed network browser.

The computer program device includes a program means having instructions that are executable by the digital processor for accessing preselected nodes of a computer network having access to computer sites worldwide. The method steps include arranging a listing of addresses of the preselected nodes, and presenting at least a portion of the listing to a user of a predetermined computer of the network. Selection of only an address on the listing is enabled for accessing the associated node from the predetermined computer, such that a node having an address not contained in the listing cannot be accessed.

Advantageously, the nodes are selected from the group of nodes consisting of: open wide area network nodes, closed wide area network nodes, local area network (LAN) nodes, LAN computer directories, LAN computer files, data storage devices, and intranet nodes. At least some of the wide area network nodes are in communication with each other via communication links. In such an instance, the method steps further include defining one of the wide area network nodes to be a test node, and then determining whether the test node affords access to an $n^{th}$ level node via (n−1) communications links, wherein "n" is an integer. The test node is designated as being an open node when n exceeds a predetermined integer.

In one preferred embodiment, the determining step further requires defining a count variable, and then incrementing the count variable by one. Next, it is determined whether the count variable exceeds the predetermined integer. An open signal is generated to indicate that the test node is open when the count variable exceeds the predetermined integer.

Otherwise, it is determined whether a link exists between the test node and one or more daughter nodes one level removed from the test node, and if not, a closed signal is generated, indicating that the test node is closed. Advantageously, if it is determined that the test node is linked to at least one daughter node, the above-described computer-implemented steps are recursively repeated until one open signal is generated or until all daughter nodes at all links have been tested without causing the generation of an open signal, whichever occurs first. In another preferred embodiment, the determining step is facilitated by presenting a data tree depiction of a node with links to a user, with the user determining whether the node is open or closed based on the depiction. Access to preselected links of a node can be prevented to "close" the preselected links, if desired.

A computer which incorporates computer-readable code means for executing the above-described steps is also disclosed.

In another aspect of the present invention, an improved network browser is disclosed. The improved network browser includes a conventional network browsing computer program for enabling a user of a computer programmed with the browser to navigate a computer network having nodes and links. Per the present invention, the present improvement includes a closed access module that presents to the user only a predefined list of uniform resource locations (URLs) for access. In accordance with the present invention described in detail below, the closed access module does not permit access to a URL which is not on the list.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of the present invention;

FIG. 1A is a schematic diagram of a program storage device of the present invention;

FIG. 2 is a schematic diagram of the allowable destination table of the present invention;

FIG. 3 is a flow chart showing the steps of the present closed browser;

FIG. 5 is a flow chart showing the steps of an alternate closed site determiner;

FIG. 6 is a flow chart showing the steps for entering a URL of a node link into the closed link array shown in FIG. 2; and FIG. 7 is a flow chart showing the steps for removing a URL of a node link from the closed link array shown in FIG. 2.

DETAILED DESCRIPTION OF THE PREFERRED EMBODIMENT

Figure 4:
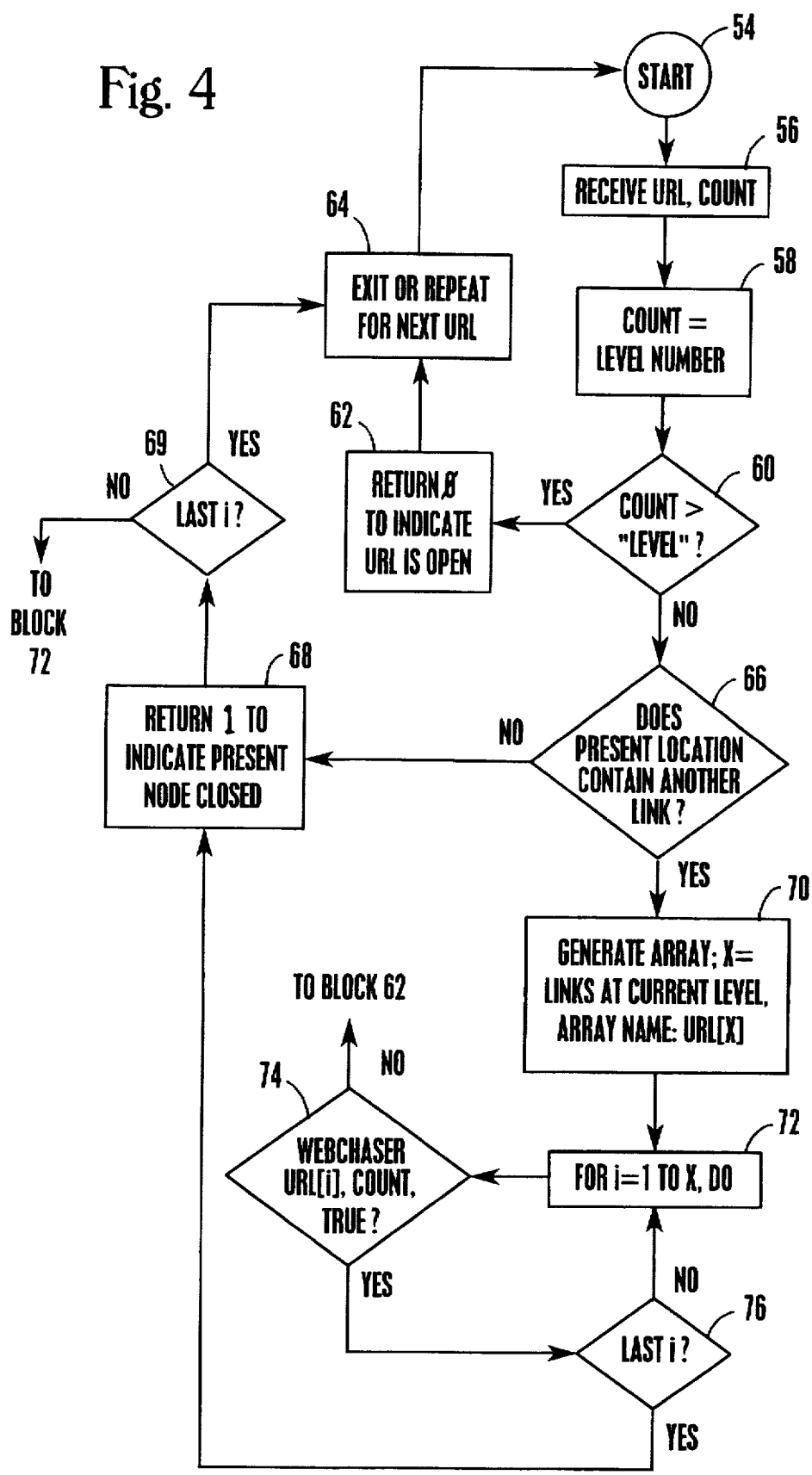
FIG. 4 is a flow chart showing the steps of the automatic closed site determiner utility of the present invention.

Referring initially to FIG. 1, a computer network browser system is shown, generally designated 10. As shown, the system 10 includes a user computer 12. The computer 12 can be a personal computer (PC), public kiosk computer for accessing informational services, or other suitable user computer appliance. As is well known in the art, the computer 12 includes a data display device, such as a monitor 14.

Additionally, the computer 12 can be associated with a data storage device, such as a hard drive 16, the files and directories on which, for purposes of the present invention, can be considered "network nodes". Further, the computer 12 is optionally connected to a local area network (LAN) 18. Either directly or from the LAN 18, the computer 12 is connected to a wide area network such as the Internet 20. Alternatively, as shown in FIG. 1 the computer 12/LAN 18 can be connected to a so-called "intranet", which is essentially another LAN having a worldwide web (WEB) server that executes an Internet protocol.

In addition to being connected to the Internet 20, the LAN 18 can also be connected to a plurality of other user computers, such as first and second LAN computers 22, 24. On the other hand, as is well known the Internet 20 affords access to a plurality of computer sites, referred to herein as "WEB sites", that are external to the LAN 18. As shown in FIG. 1, these WEB sites can include one or more "open" WEB sites 26, and one or more "closed" WEB sites 28, 30.

As is also well known in the art, the computer 12 can access a WEB site through the network described above, and from that WEB site gain direct access to other sites, referred to herein as "first level" sites. From these first level sites, the computer 12 in turn may be able to access WEB sites at yet a second level, and so on. In accordance with the present invention, a WEB site is open if an integer number or more levels of other WEB sites may be accessed from the open WEB site, with the integer number being a user-determined variable referred to herein as "LEVEL". Stated differently, a WEB site is open if more than a predetermined number of levels of other WEB sites may be accessed therefrom. Otherwise, it is "closed".

Per the present invention, the computer 12 includes a modular closed browser 32. As described more fully below, the browser 32 is "closed" in that it permits a user of the computer 12 to select for access only predetermined destinations. Stated somewhat differently, the closed browser 32 is a closed access module that presents to the user only a predefined list of uniform resource locations (URLs) for access, and not permitting access to a URL not on the list. These predetermined destinations can include open WEB sites, closed WEB sites, LANs, particular LAN computers, particular storage devices, and indeed particular files in particular directories. As intended by the present invention, the closed browser 32 is associated with and manipulates a conventional computer network navigation control system, such as the control system marketed under the trade name "Active X" by Microsoft Corp. of Redmond, Washington and based on the so-called hypertext markup language (HTML) protocol. As discussed below, the closed browser 32 is a module which functionally replaces only the portion of a conventional computer network navigation control program that permits a user to input any URL for accessing the node that is associated with the URL.

FIGS. 3-7 illustrate the structure of the closed browser of the present invention as embodied in computer program software. Those skilled in the art will appreciate that the Figures illustrate the structures of computer program code elements that function according to this invention. Manifestly, the invention is practiced in its essential embodiment by a machine component that renders the computer program code elements in a form that instructs a digital processing apparatus (that is, a computer) to perform a sequence of function steps corresponding to those shown in the Figures.

These instructions may reside on a program storage device including a data storage medium, such as a computer diskette 34 shown in FIG. 1A. The machine component is shown in FIG. 1A as a combination of program code elements A-D in computer readable form that are embodied in a computer-usable data medium 36, on the computer diskette 34. Alternatively, such media can also be found in semiconductor devices, on magnetic tape, on optical disks, on a DASD array, on magnetic tape, on a conventional hard disk drive, on electronic read-only memory or on electronic ransom access memory, or other appropriate data storage device. In an illustrative embodiment of the invention, the computer-executable instructions may be lines of compiled Visual Basic code.

Now referring to FIG. 2, a closed browser array 37A is shown. As shown, the array 37A may be in table array form. As also shown, the array 37A is a listing of addresses, preferably in URL format, of preselected computer network nodes. For example, the array 37A may include an address 38A to the hard drive 16, and/or an address 40A to the first LAN computer 22. Along with the addresses, the array 37A can also include an alpha-numeric identification of the node corresponding to the address, as shown. Also, the array 37A may include an address 42A to the second of the closed WEB sites 30. In the example shown, the addresses 38A, 40A, 42A are the only addresses entered. It is to be understood, however, that the addresses, preferably in URL format, of additional LANs, intranets, and open WEB sites may be included on the array 37A. Indeed, particular files in particular network directories may be included, and other files excluded, from the array 37A.

Additionally, FIG. 2 shows that a closed link array 37B can be provided that is substantially identical in structure to the closed browser array 37A, except that the closed link array 37B includes the URLs to particular links of particular open web sites. As discussed further below, the closed link array 37B defines links of open web sites to which access is disallowed. Thus, assuming for illustration purposes that the open web site 26 shown in FIG. 1 is included in the closed browser array 37A, the closed link array 37B in FIG. 2 can include an entry 38B indicating that a first link of the otherwise open web site may not be accessed, and is accordingly "closed". Links to the open web site 26 that are not included in the closed link array 37B may be accessed, however, assuming that the associated web site appears as an allowable URL in the closed browser array 37A.

Referring to FIG. 3, the overall process of the present invention can be seen. At block 44, the desired addresses (i.e., the identifications in URL format of the preselected nodes) are manually input by a person to the listing 37. On the other hand, if desired at block 46 the addresses of closed WEB sites that have been automatically determined to be closed can be input automatically to the listing 37. The details of how the present invention determines whether a WEB site is open or closed are discussed further below in reference to FIGS. 4-7.

Next, the listing 37 is constructed at block 48, based on the inputs at blocks 44 and 46. The listing 37 is then presented on the monitor 14 when the user inputs a command to access a network node.

Then, at block 52, the user selects a node address from the listing 37. As mentioned above, the portion of the conventional computer network navigation program that permits user entry of any URL is replaced by code means that embody the steps shown in FIG. 3. Thus, at block 52, a URL from the listing 37 and only from the listing 37 may be selected; nodes that are associated with URLs which are not on the listing 37 cannot be accessed. Stated differently, at block 52 the selection of only an address on the listing 37 is enabled from the computer 12, such that a node having an address not contained in the listing 37 cannot be accessed.

From block 52, the process moves to decision diamond 53A to determine whether a link to a node enabled at block 52 has been selected. If not, the process moves to a wait state, designated herein as the letter "A" in a circle. On the other hand, if a link to a node enabled at block 52 has been selected, the process moves to decision diamond 53B to determine whether the selected link appears in the closed link array 37B shown in FIG. 2. If so, the process moves to block 53C to display a message that the URL of the selected link and, hence, the selected link itself, is "closed", i.e., that access to the selected link is not permitted. In contrast, if the selected link does not appear in the closed link array 37B shown in FIG. 2, the process moves from decision diamond 53B to block 53D to load the URL of the selected link and thereby permit access to the link. The process then moves to the wait state.

Now referring to FIG. 4, the details of a first embodiment of the computer-implemented process generally shown at block 46 in FIG. 3 can be seen. Starting at circle 54, the process moves to block 56, wherein the process receives a URL of a node for which it is desired to determine whether the node is open or closed. Also at block 56, the process receives a dummy variable termed herein "count", which is initialized with a value of zero (0).

Moving to block 58, the process sets the variable "count" to equal the level number of the node under test. For example, for the test node received at block 56, the level number is "one", and consequently the value of "count" is incremented by unity at block 58. As more fully disclosed below, the level number of nodes ("daughter nodes") that are directly accessible from the test node is "two" the level number of nodes ("granddaughter nodes") that are directly accessible from a daughter node is "three", and so on. Thus, the level number of a node is one less than number of links from that node to the test node.

From block 58, the process moves to decision diamond 60. At decision diamond 60, the process determines whether the value of the variable "count" exceeds the value of a user-defined predetermined integer, referred to herein as "level". If so, the process moves to block 62 to generate an "open" signal, indicating that the node associated with the URL is open. In one presently preferred embodiment, the process returns a "0" at block 62 to indicate an open node.

From block 62, the process moves to block 64. At block 64, the process either exits or automatically accesses other URLs for test. The other URLs may be provided in a predefined list of WEB site URLs for which it is desired to determine whether the WEB sites are open or closed.

On the other hand, if the test at decision diamond 60 is negative, the process moves to decision diamond 66, wherein it is determined whether the present location contains a link to another node. In other words, for the particular node being examined, it is determined at decision diamond 66 whether the node is linked to other nodes. If not, the process moves to block 68 to generate a "closed" signal by returning a "1". The closed signal indicates that the node being tested is closed. When the node being tested is the test node received at block 56, the test node is "closed". If desired, the node may be added to a list of closed nodes.

Next, it determined at decision diamond 69 whether the recursive routine described more fully below has been invoked and if so, whether the node under test is the last node in the routine. If so, the process moves to block 64. Otherwise, the process moves to block 72 to continue the recursive process set forth in detail below.

With respect to the recursive process mentioned above, if the test at decision diamond 66 is positive, the process moves to block 70 to generate an array URL[x]. Per the present invention, "x" equals the number of links at the current network level of the node that is associated with the URL received at block 56. In other words, "x" equals the number of daughter nodes relative to the node under test, i.e., the number of nodes that can be accessed directly from the node under test.

Moving to block 72, the process enters a recursive loop, potentially but not necessarily for each daughter node. Specifically, for "i"=1 to "x", the process moves to decision diamonds 74 and 76 to apply the steps shown in blocks 58–72 for the daughter nodes in sequence, until either all daughter nodes have been tested "closed" as determined at decision diamond 76 or until an "open" signal is generated at block 62, whichever occurs first.

For example, assume that a test node received at block 56 is linked to three daughter nodes $DN_{1,2}$, $DN_{2,2}$, and $DN_{3,2}$, wherein the first numeral in the subscript represents the "x" value of the daughter node, and the second numeral represents the level of the daughter node with respect to the test node. The first daughter node $DN_{1,2}$ is tested using the method shown in blocks 58–72. Thus, the variable "count" is set equal to the level number "two" of the node under test by incrementing "count" by unity, and the test at decision diamond 60 executed.

If the process moves to decision diamond 66 as a result of the test at decision diamond 60, it is essentially determined whether the first daughter node $DN_{1,2}$ includes granddaughter nodes $GDN_{x',1,3}$, wherein the first numeral x' is the number of granddaughter nodes of the first daughter node $DN_{1,2}$, the second numeral "1" indicates that the first daughter node $DN_{1,2}$ is the parent node to the granddaughter nodes $GDN_{x',1,3}$, and the third numeral "3" indicates that the granddaughter nodes are at level "three".

If any granddaughter nodes $GDN_{x',1,3}$ are found to be present, an array URL[x'] is generated at block 70. Then, for the first granddaughter node $GDN_{x',1,3}$, the recursive loop shown in steps 72–76 is repeated as described, with the variable "count" set equal to "three".

Assume that the test for the first granddaughter node $GDN_{1,1,3}$ is negative at decision diamond 60, and that it is determined, at decision diamond 66, that the first granddaughter node $GDN_{1,1,3}$ does not contain links to any nodes at level "four". Then, the second granddaughter node $GDN_{2,1,3}$ of the first daughter node $DN_{1,2}$ is tested, and so on. If at any time an "open" signal is generated, the test node received at block 56 is designated as "open", and the above-described routine stops. Otherwise, all granddaughter nodes $GDN_{x',1,3}$ are sequentially tested.

After all granddaughter nodes $GDN_{x',1,3}$ of the first daughter node $DN_{1,2}$ are tested without an "open" signal being generated, the second daughter node $DN_{2,2}$ is tested. The recursive routine continues until either an "open" signal is generated, or until all links levels have been explored and all nodes have been determined to be closed. In the latter case, it is thereby indicated that the test node whose URL was received at block 56 satisfies the user-defined criteria of "closed", as defined by the value of the variable "level".

FIGS. 5–7 show a second embodiment of the present web chaser. Commencing at start circle 80, the process moves to decision diamond 82 to determine whether any node URL data has been loaded into a web site database. If not, the process moves to block 84 to prompt the user to enter a desired node URL to the web site database and data array.

Then, the process moves to block 86 to update the database which, in the preferred embodiment, uses a data tree format. Accordingly, by "updating the database" is meant that the URL is input to the database as the root of a data tree. Additionally, as indicated in FIG. 5, at block 86 the HTML control is also updated. When updated, the HTML control makes available to the database the links that are associated with the node of the URL. Per the present invention, these links are stored as branches of the data tree that represents the node.

Proceeding to decision diamond 88, it is determined whether any branch of the data tree has been selected by the user for access. In other words, at decision diamond 88 it is determined whether the user has elected to access a link of the node. If not, the process moves to the wait state. In contrast, if the user has elected to access a link of the node, the process moves to block 90, wherein a data tree is built having the node at the root and the various links as branches.

Additionally, if the test at decision diamond 82 was positive, the process moves to block 90, wherein the selected URL is loaded into the HTML arrays and its links made available for access. From block 92, the process moves to block 90.

Continuing with the description of FIG. 5, from block 90 the process moves to block 94, wherein it is determined whether the URL is open or closed. This determination is made using the criteria set forth above in reference to FIG. 4, i.e., by counting the number of link (branch) levels from the node (root) and comparing the count to a predetermined "level" integer.

Moving to decision diamond 96, it is determined whether a home page for the node under test has been defined as the home page to display to the user. If so, the process enters the wait state, but otherwise moves to block 98 to define which page of the node under test to display upon selection of the node.

FIG. 6 shows that a node that otherwise would be classified as "open" can in effect be "closed" by the system administrator by preventing access to one or more links from the node. Starting at start circle 100, the process moves to decision diamond 102 to determine whether the user has indicated a desire to prevent access to (i.e., to "close") a link of a selected node by, e.g., appropriately "clicking" a mouse or by appropriately manipulating another data input device, e.g., a touch screen display. If not, the process moves to the wait state. If the user has clicked on a link to indicate a desire to close the link, however, the process moves to block 104, wherein the URL of the link is added to the Closed Link array 37B shown in FIG. 2. From block 104, the process moves to block 106 to update the icon of the link and to update the data tree as appropriate to indicate the new access status of the link. From block 106, the process enters the wait state.

FIG. 7 shows that a link, once closed using the process shown in FIG. 6, can be reopened if desired. Commencing at start circle 108, the process moves to decision diamond 110 to determine whether the user has indicated a desire to prevent access to (i.e., to "close") a link of a selected node by, e.g., appropriately "clicking" a mouse. If not, the process moves to the wait state. If the user has clicked on a link to indicate a desire to open the link, however, the process moves to block 112, wherein the URL of the link is removed to the Closed Link array 37B shown in FIG. 2. From block 112, the process moves to block 106.

While the particular CLOSED BROWSER FOR COMPUTER AND COMPUTER NETWORK as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. A computer program device comprising:
   a computer program storage device readable by a digital processing system; and
   a program means on the program storage device and including instructions executable by the digital processing system for performing method steps for accessing preselected nodes of a computer network having access to computer sites worldwide wherein at least some of the nodes are in communication with each other via communication links, the method steps comprising:
   arranging a listing of addresses of the preselected nodes;
   presenting at least a portion of the listing of the preselected nodes to a user of a predetermined computer of the network;
   enabling selection of only an address on the listing of the preselected nodes for accessing the associated node from the predetermined computer, such that a node having an address not contained in the listing of the preselected nodes cannot be accessed;
   arranging a listing of closed links;
   enabling the user of the predetermined computer to access a link associated with one of the preselected nodes, based on whether the link appears in the listing of closed links;
   defining one of the nodes to be a test node;
   determining whether the test node affords access to an $n^{th}$ level node via (n−1) communications links, wherein "n" is an integer; and
   designating the test node as an open node when n bears a preselected relationship to a predetermined integer.

2. The computer program device of claim 1, wherein the nodes are selected from the group of nodes consisting of: open wide area network nodes, closed wide area network nodes, local area network (LAN) nodes, LAN computer directories, LAN computer files, data storage devices, and intranet nodes.

3. The computer program device of claim 1, wherein the nodes are selected from the group of nodes consisting of: closed wide area network nodes, local area network (LAN) nodes, LAN computer directories, LAN computer files, data storage devices, and intranet nodes.

4. The computer program device of claim 1, wherein the determining step further comprises the steps of:
   (d) defining a count variable;
   (e) incrementing the count variable by one;
   (f) determining whether the count variable exceeds the predetermined integer;
   (g) generating an open signal indicating that the test node is open when the count variable exceeds the predetermined integer; otherwise
   (h) determining whether a link exists between the test node and one or more daughter nodes one level removed from the test node, and if not, generating a closed signal indicating that the test node is closed.

5. The computer program device of claim 4, wherein when it is determined at step (h) that the test node is linked to at least one daughter node, the method steps further include
   (i) recursively repeating steps (e)–(h) for the daughter nodes until one open signal is generated or until all daughter nodes at all links have been tested using steps (e)–(i) without causing the generation of an open signal, whichever occurs first.

6. The computer program device of claim 1, wherein the method steps further comprise preventing access to one or more preselected links from an open node.

7. An improved network browser, including a conventional network browsing computer program for enabling a user of computer programmed with the browser to navigate a computer network having nodes and links, wherein the improvement comprises:
   a closed access module presenting to the user only a predefined list of uniform resource locations (URLs) for access, the closed access module not permitting access to a URL not on the list, the closed access module being associated with:
   computer readable code means for defining one of the nodes to be a test node; and computer readable code means for determining whether the test node affords access to an $n^{th}$ level node via (n−1) communications links, wherein "n" is an integer, such that the test node can be designated as an open node when n exceeds a predetermined integer.

8. The improved network browser of claim 7, wherein the nodes are selected from the group of nodes consisting of: open wide area network nodes, closed wide area network nodes, local area network (LAN) nodes, LAN computer directories, LAN computer files, data storage devices, and intranet nodes.

9. The improved network browser of claim 7, wherein the nodes are selected from the group of nodes consisting of: closed wide area network nodes, local area network (LAN) nodes, LAN computer directories, LAN computer files, data storage devices, and intranet nodes.

10. The improved network browser of claim 7, further comprising:
   (c) computer readable code means for defining a count variable;
   (d) computer readable code means for incrementing the count variable by one;
   (e) computer readable code means for determining whether the count variable exceeds the predetermined integer;
   (f) computer readable code means for generating an open signal indicating that the test node is open when the count variable exceeds the predetermined integer, and otherwise determining whether the test node is linked to one or more daughter nodes one level removed from the test node, and if not, generating a closed signal indicating that the test node is closed.

11. The improved network browser of claim 7, further comprising computer readable code means for preventing access to one or more preselected links from an open node.

12. A computer defining a network node and connected to a computer network via a link, comprising:
   computer readable code means for arranging a listing of addresses of preselected nodes;
   computer readable code means for presenting at least a portion of the listing of addresses of preselected nodes to a user of the computer;

computer readable code means for enabling selection of only an address on the listing of addresses of preselected nodes for accessing the associated node from the computer, such that a node having an address not contained in the listing of addresses of preselected nodes cannot be accessed by the computer;

computer readable code means for arranging a listing of closed links;

computer readable code means for enabling the user of the computer to access a link associated with one of the preselected nodes based on whether the link appears in the listing of closed links;

computer readable code means for defining one of the nodes to be a test node;

computer readable code means for determining whether the test node affords access to an $n^{th}$ level node via (n−1) communications links, wherein "n" is an integer; and computer readable code means for designating the test node as an open node when n bears a preselected relationship to a predetermined integer.

13. The computer of claim 12, wherein the nodes are selected from the group of nodes consisting of: open wide area network nodes, closed wide area network nodes, local area network (LAN) nodes, LAN computer directories, LAN computer files, data storage devices, and intranet nodes.

14. The computer of claim 12, wherein the computer readable code means for determining further comprises:

(d) computer readable code means for defining a count variable;

(e) computer readable code means for incrementing the count variable by one;

(f) computer readable code means for determining whether the count variable exceeds the predetermined integer;

(g) computer readable code means for generating an open signal indicating that the test node is open when the count variable exceeds the predetermined integer, and otherwise determining whether a link exists between the test node and one or more daughter nodes one level removed from the test node, and if not, generating a closed signal indicating that the test node is closed.

15. The computer of claim 14, further comprising:

(h) computer readable code means for, when the computer readable code means determines at step (g) that the test node is linked to at least one daughter node, recursively invoking computer readable code means (e)–(g) for the daughter nodes until one open signal is generated or until all daughter nodes at all links have been tested using steps (e)–(h) without causing the generation of an open signal, whichever occurs first.

* * * * *